US010156874B2

United States Patent
Hooton et al.

(10) Patent No.: US 10,156,874 B2
(45) Date of Patent: Dec. 18, 2018

(54) THERMAL FEATURES OF AN ELECTRONIC DEVICE AND METHOD FOR FORMING AN ELECTRONIC DEVICE INCLUDING THERMAL FEATURES

(71) Applicant: Apple Inc., Cupertino, CA (US)

(72) Inventors: Lee E. Hooton, Cupertino, CA (US); Ian A. Spraggs, San Francisco, CA (US); Marwan Rammah, Cupertino, CA (US); Seth Reightler, San Francisco, CA (US); Tyler Kakuda, Stockton, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 15/146,825

(22) Filed: May 4, 2016

(65) Prior Publication Data

US 2017/0068292 A1    Mar. 9, 2017

Related U.S. Application Data

(60) Provisional application No. 62/214,614, filed on Sep. 4, 2015.

(51) Int. Cl.
    *G09F 13/04*    (2006.01)
    *G06F 1/20*     (2006.01)
    *G06F 1/16*     (2006.01)

(52) U.S. Cl.
    CPC .......... *G06F 1/203* (2013.01); *G06F 1/1626* (2013.01); *G06F 1/1637* (2013.01)

(58) Field of Classification Search
    CPC ............ G06F 1/20; G06F 1/203; G06F 1/206; H04M 1/02; H05K 7/20; H05K 7/20259; H05K 7/20263
    See application file for complete search history.

(56) References Cited

U.S. PATENT DOCUMENTS

| 8,152,337 B2 | 4/2012 | Herms et al. |
| 9,545,039 B2 | 1/2017 | Tokuyama |
| 2006/0245167 A1 | 11/2006 | Jeong |
| 2009/0231297 A1 | 9/2009 | Hatakeyama |

(Continued)

FOREIGN PATENT DOCUMENTS

| CN | 204090294 | 1/2015 |
| CN | 104506680 | 4/2015 |
| CN | 104601759 | 5/2015 |

*Primary Examiner* — Ali Alavi
(74) *Attorney, Agent, or Firm* — Dickinson Wright RLLP

(57) ABSTRACT

This application relates to thermal management of a computing device using various features that can dissipate and direct thermal energy. In some embodiments, a thermal insert is set forth for separating a component from a cover glass of the computing device. The thermal insert can be attached to a frame of the computing device by insert molding the thermal insert to the frame. In other embodiments, a graphite strip can be disposed across different surfaces within the computing device in order to direct thermal energy away from a component of the computing device. In yet other embodiments, a thermal spreader and thermally conductive adhesive can be disposed over different surfaces of the computing device. For example, the thermal spreader and thermally conductive adhesive can be used to direct thermal energy away from a backlight of the computing device.

20 Claims, 9 Drawing Sheets

(56) References Cited

U.S. PATENT DOCUMENTS

| | | | |
|---|---|---|---|
| 2011/0054576 A1* | 3/2011 | Robinson | A61F 7/02 |
| | | | 607/108 |
| 2012/0069515 A1 | 3/2012 | Tan | |
| 2013/0052465 A1* | 2/2013 | Shen | B29C 45/1671 |
| | | | 428/412 |
| 2014/0078676 A1 | 3/2014 | Hsiao et al. | |
| 2014/0085911 A1 | 3/2014 | Zhang et al. | |

* cited by examiner

THERMAL FEATURES OF AN ELECTRONIC DEVICE AND METHOD FOR FORMING AN ELECTRONIC DEVICE INCLUDING THERMAL FEATURES

The present application claims the benefit of U.S. Provisional Application No. 62/214,614, entitled "THERMAL FEATURES OF A MOBILE DEVICE" filed Sep. 4, 2015, the content of which is incorporated herein by reference in its entirety for all purposes.

FIELD

The described embodiments relate generally to features of a mobile device that promote heat dissipation and reduce hot spots at the mobile device. More particularly, some of the embodiments herein relate to structural features that manage and direct heat emitted from a camera and a display backlight of the mobile device.

BACKGROUND

A mobile device can incorporate a variety of electrical components that can generate heat, which can travel throughout the mobile device and reach external surfaces of the mobile device. When heat builds up within a mobile device, the mobile device may be programmed to throttle certain functions of the mobile device, thereby limiting the performance of the mobile device. If heat is not managed adequately within the mobile device, throttling can occur more often than necessary, which can diminish the user experience because of a lack of reliability of the mobile device. Moreover, if heat is not mitigated at certain locations of the mobile device, external surfaces of the mobile device may cause discomfort for any user that is touching the mobile device.

SUMMARY

This paper describes various embodiments that relate to features for improving thermal management of a computing device. In some embodiments, a computing device is set forth as having a component that outputs thermal energy. The computing device can include a frame that has an opening. Additionally, the computing device can include a thermal insert that at least partially closes the opening and is secured to the frame. Furthermore, the computing device can include a cover glass coupled to the frame, and the thermal insert can be configured to direct the thermal energy away from the cover glass. The thermal insert can be at least partially composed of molybdenum and extend at least partially into a surface of the frame.

In other embodiments, a thermal management system is set forth. The thermal management system can include a thermal spreader configured to absorb thermal energy emitted by a component of the computing device. Additionally, the thermal management system can include an adhesive disposed between the thermal spreader and an internal surface of the computing device. The thermal spreader and the adhesive can be arranged to direct thermal energy away from the component. In some embodiments, the thermal management system can include a flexible connector configured to connect to a surface of a light emitting diode (LED). The surface of the LED can be arranged to oppose a cover glass of the computing device.

In yet other embodiments, a method for assembling a computing device is set forth. The method can include the steps of attaching a thermal insert to a frame of the computing device, and attaching a cover glass to the frame such that a component of the computing device can be at least partially separated from the cover glass by the thermal insert. The thermal insert can be incorporated into a cavity of the frame and thereafter insert molded into the cavity. The method can further include steps of applying a graphite infused adhesive to a surface of the computing device and disposing a thermal spreader over the graphite infused adhesive to bond the thermal spreader to the surface of the computing device. Furthermore, the method can include connecting a flexible connector to a light emitting diode (LED) array of the computing device such that the flexible connector at least partially extends between the thermal spreader and the LED array.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
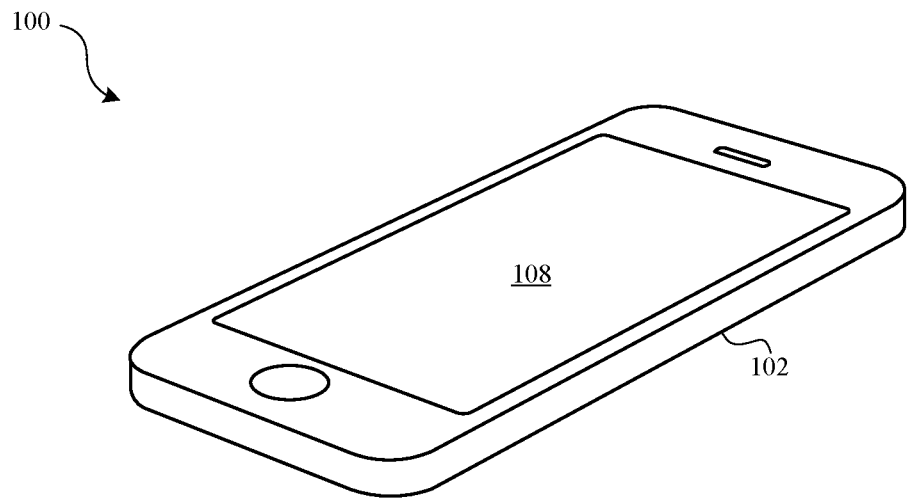
FIGS. 1A and 1B illustrate perspective views of a computing device that includes a cover glass and a camera.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Many mobile devices incorporate heat generating components such as light emitting diodes (LEDs), cameras, and processors, which provide some of the most frequently used features of mobile device. Because such heat generating components are actively outputting heat during much of the lifetime of a mobile device, controlling the flow of heat within the mobile device can be essential to ensuring a comfortable user experience. For example, when heat is not adequately controlled within a mobile device, hot spots can form on external surfaces of the mobile device, rendering the mobile device uncomfortable to touch. Additionally, when heat builds up within a mobile device, certain subsystems and components within the mobile device may be programmed to throttle when the temperature of the mobile device is elevated. As a result, performance of the mobile device may be intentionally limited as the temperature of the mobile device increases, thereby briefly hindering the utility of the mobile device. The embodiments discussed herein are provided as features for better managing thermal energy within a mobile device.

In some embodiments, a thermal insert is incorporated near a component of the mobile device for capturing and spreading thermal energy that is generated by the component, and to avoid the thermal energy being incident upon an exterior surface the mobile device. In some embodiments, the thermal insert is disposed between a cover glass of the mobile device and a camera of the mobile device, such that the thermal insert absorbs and spreads some of the thermal energy away from the camera. The thermal insert can be attached to a frame of the mobile device that holds the cover glass when the mobile device is assembled. The frame can initially include an opening for the thermal insert, which can be hooked into the frame using one or more hooks provided in the thermal insert. The thermal insert can at least partially extend through a cross section of the frame in order to secure thermal insert to the frame, as well as brace the camera against the frame and a housing of the mobile device. The thermal insert can have a thickness suitable for dispensing enough thermal energy so as to not promote throttling of the camera or other component to which the thermal insert is proximate. In some embodiments, the thermal insert can be 0.15 to 0.2 millimeters thick. However, in other embodiments, the thermal insert can be less than 0.15 millimeters thick or greater than 0.2 millimeters thick. The thermal insert can be made from a metal such as molybdenum or a metal alloy that includes molybdenum. However, it should be noted that the thermal insert can be made from any material suitable for dissipating and/or directing thermal energy output by a component of a computing device. When connected to the frame, the thermal insert can appear flush with the frame using chamfered openings of the thermal insert, which can be used to connect the thermal insert to the frame. Furthermore, the thermal insert can include angled edges and/or one or more non-coplanar surfaces in order to connect the thermal insert to the frame while providing additional space for the camera or other component from which the thermal insert is absorbing thermal energy.

In some embodiments, a graphite strip is disposed between the cover glass and the camera in order to spread heat that is generated by the camera. In this way, less heat is absorbed by the cover glass. The graphite strip can be a die cut piece of graphite that can be connected to the frame of the mobile device and/or to the thermal insert discussed herein. In some embodiments the graphite strip is connected to a ceramic layer of a camera assembly of the mobile device. The camera assembly can include one or more graphite layers and one or more ceramic layers that are stacked in an alternating arrangement. In this way, a thermally conductive material (e.g., graphite) would be exchanging heat with an insulating material (e.g., ceramic) as a way to better direct and manage thermal energy generated by the camera of the camera assembly. In some embodiments, the camera assembly can also include a stiffener layer for holding the camera in place. The graphite strip can be disposed between the stiffener layer and the frame, and/or between the stiffener layer and a sensor of the camera.

The display of the mobile device can also generate heat that can travel to the cover glass, given the purpose of the display is to project light through the cover glass. When a display incorporates a backlight, the backlight can generate heat that can localize according to where the backlight is within the mobile device. For backlights that include light emitting diodes (LEDs) on one or more sides of the display, the LEDs can be a substantial source of thermal energy that is absorbed by the cover glass. The LEDs can receive power from flexible connectors, which can also absorb thermal energy generated by the LEDs. However, in order to mitigate the amount of thermal energy traveling from the LEDs to the cover glass, the flexible connectors can be arranged on a side of the LEDs that is opposite the cover glass. In this way, the flexible connectors will avoid collecting thermal energy between the cover glass and LEDs, and, rather, distribute the thermal energy to another region of the mobile device. In order to further help distribute and dissipate thermal energy generated by the LEDs, thermal spreaders can be incorporated in the mobile device. The thermal spreaders can be connected to one or more surfaces of the mobile device by a thermally conductive adhesive. The thermally conductive adhesive can be any adhesive incorporating thermally conductive particles. For example, the thermally conductive adhesive can be a graphite infused adhesive.

During assembly of the mobile device, the thermally conductive adhesive can be applied to an internal surface of the mobile device near the LEDs of the backlight. A thermal spreader can be disposed over the adhesive to collect thermal energy from the LEDs. In order to dissipate the heat generated from the LEDs, additional thermal spreaders and thermally conductive adhesive can be incorporated into the mobile device to create a path for heat to travel. For example, the heat spreaders and thermally conductive adhesive can extend across one or more surfaces of the mobile device, away from the cover glass. The path of the thermally conductive adhesive and the thermal spreaders can be in a similar direction as the flexible connectors for the LEDs. In this way, the thermal conductivity of the flexible connectors can be leveraged in order to further help dissipate and redirect the thermal energy generated by the LEDs. Improvements in the dissipation of thermal energy can be exhibited when the backlight is operating at maximum brightness. By improving heat dissipation of the backlight, a user is able to operate the mobile device at a higher brightness for a longer period of time without causing the mobile device to throttle certain subsystems of the mobile device based on the temperature of the mobile device.

These and other embodiments are discussed below with reference to FIGS. 1A-9; however, those skilled in the art will readily appreciate that the detailed description given herein with respect to these figures is for explanatory purposes only and should not be construed as limiting.

FIG. 1A illustrates a perspective view 100 of computing device 102 with a cover glass 108. The computing device 102 can be any type of device including, but not limited to, a cellular phone, laptop, media player, desktop computer, watch, display, or any other suitable device that can exhibit thermal energy. The cover glass 108 can be illuminated at least in part by a backlight made up of one or more light emitting diodes (LEDs) that have an adjustable brightness. During operation, the LEDs can emit thermal energy, which can be absorbed by the cover glass 108 causing the cover glass 108 to heat up. When a user of the computing device 102 is touching the cover glass 108, the heat of the cover glass 108 can be perceived by the user and cause the user much discomfort. Additionally, as heat builds up at the computing device 102, certain features of the computing device 102 can be throttled in order to reverse the buildup of heat. In order to better manage and dissipate heat at the computing device 102, the computing device can incorporate various heat dissipating features that can direct heat away from the cover glass 108. Additionally, because the signals for operating the LEDs can be provided through a flexible connection within the computing device 102, the flexible connection can connect to the LEDs on a side of the LEDs opposite the cover glass 108. In this way, because the flexible connection can also absorb and direct heat, more heat will be directed away from the cover glass 108.

Figure 1B:
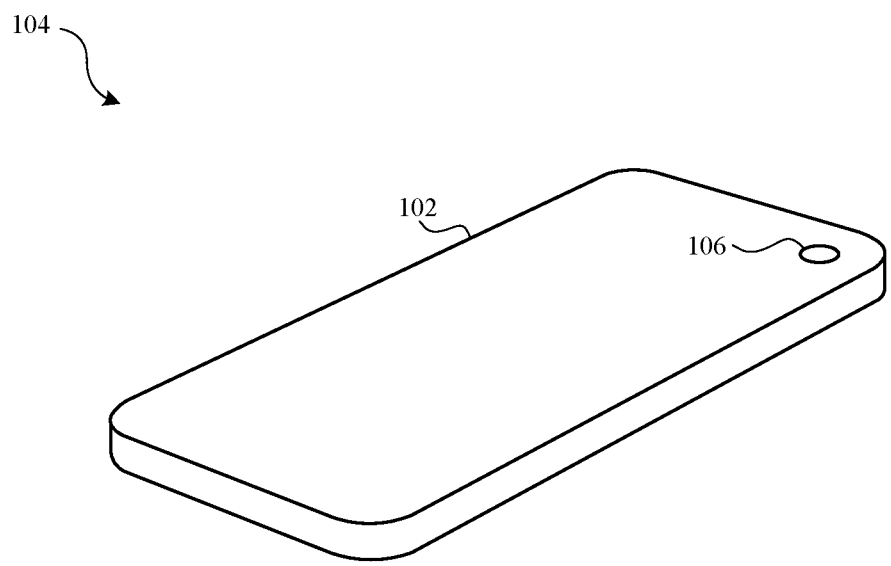

Other areas where heat can build up include areas near a camera 106 of the computing device 102, as illustrated in FIG. 1B. Specifically, FIG. 1B illustrates a perspective view 104 of the camera 106 on a side of the computing device 102 that is opposite the cover glass 108. As the camera 106 is used to capture photographs and videos, a sensor of the camera 106 can emit thermal energy, which can travel to other areas of the computing device 102 such as the cover glass 108. In order to direct and dissipate heat away from the camera 106 and the LEDs of the backlight, the computing device 102 can include thermal spreaders that are attached to internal surfaces of the computing device 102. The thermal spreaders can be attached to the internal surfaces of the computing device 102 using a graphite infused adhesive, which can also direct and dissipate heat away from certain components of the computing device 102. To further collect and dissipate heat, one or more thermal inserts can be disposed between the camera 106 and the cover glass 108 in order to capture thermal energy generated by the camera 106 and direct the thermal energy away from the cover glass 108, as further discussed herein.

Figure 2:
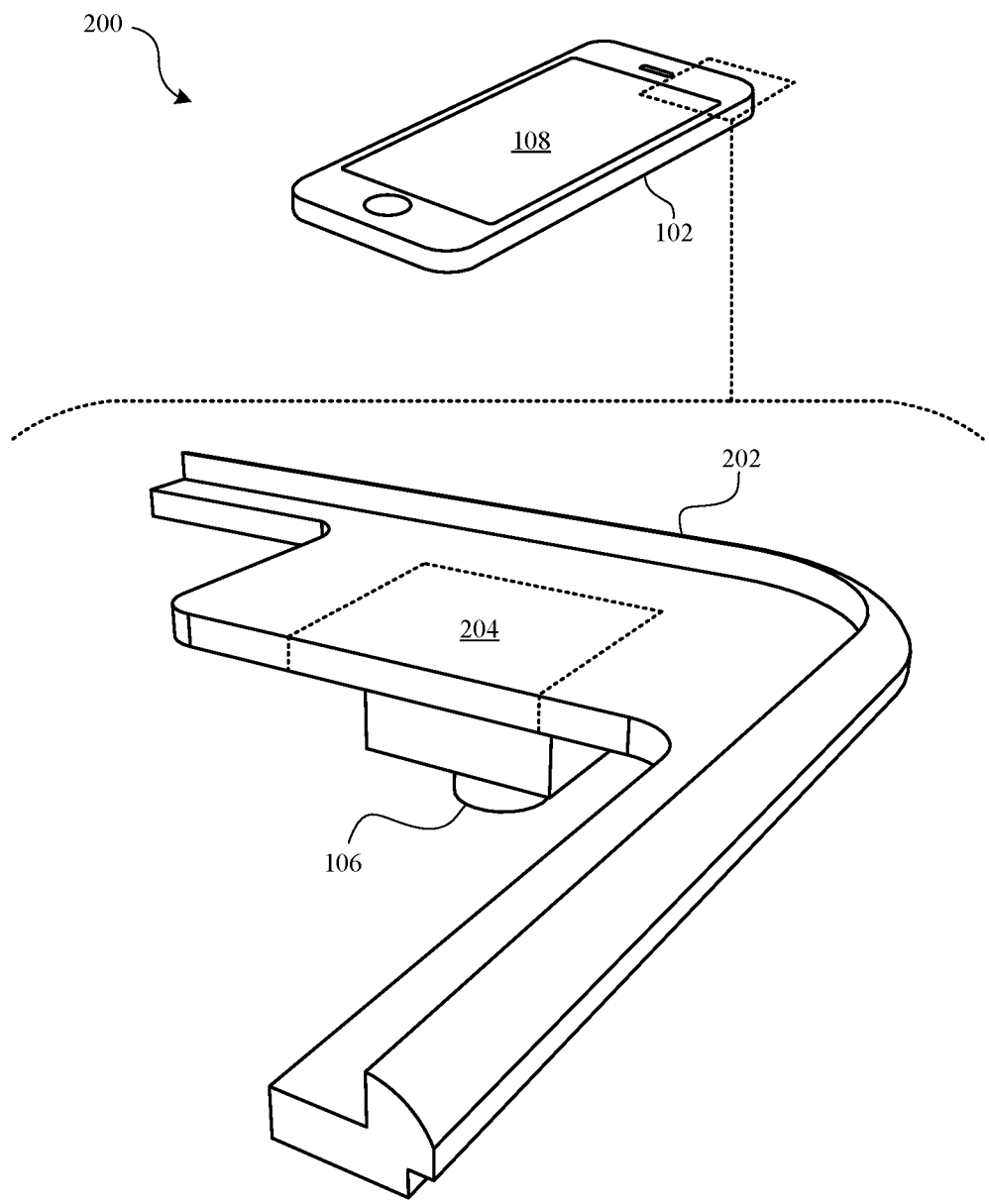
FIG. 2 illustrates a perspective view of a section of a frame of the computing device near the camera.

FIG. 2 illustrates a perspective view 200 of a section of a frame 202 of the computing device 102 near the camera 106. Specifically, the FIG. 2 illustrates an embodiment of the computing device 102 that includes the frame 202 having a frame region 204 disposed between the cover glass 108 and the camera 106. The frame region 204, illustrated as the region of the frame 202 within the dotted lines of the frame 202, can be made from the same material as the rest of the frame 202. In this way, some of the heat generated by the camera 106 can be received by the frame region 204, and thereafter distributed to the rest of the frame 202 in order to help direct the heat away from the cover glass 108. However, in order to help distribute and dissipate the heat generated by the camera 106, the frame region 204 can be at least partially removed to create a gap that can include one or more thermally conductive layers, as discussed herein.

Figure 3A:
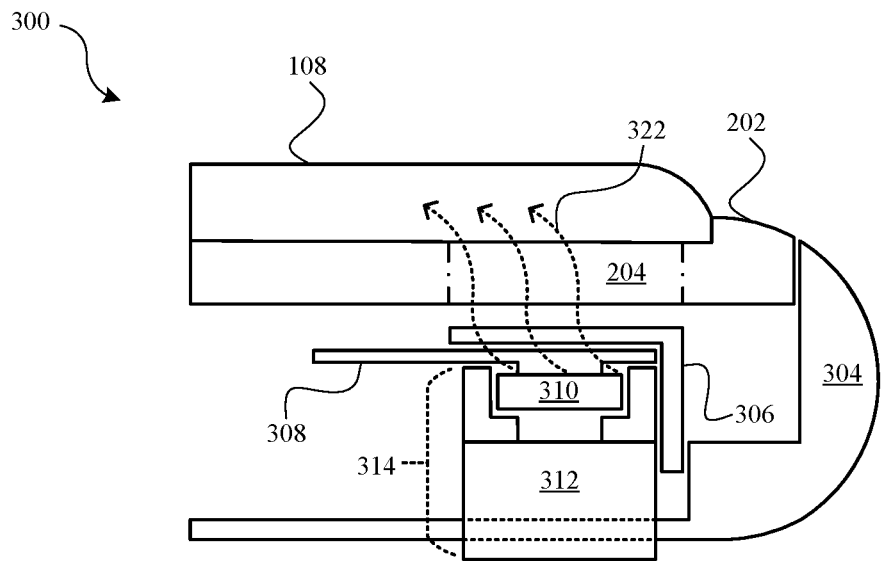
FIGS. 3A and 3B illustrate cross sectional views and of the computing device discussed herein, and how thermal energy can be handled in different embodiments of the computing device.
Figure 3B:
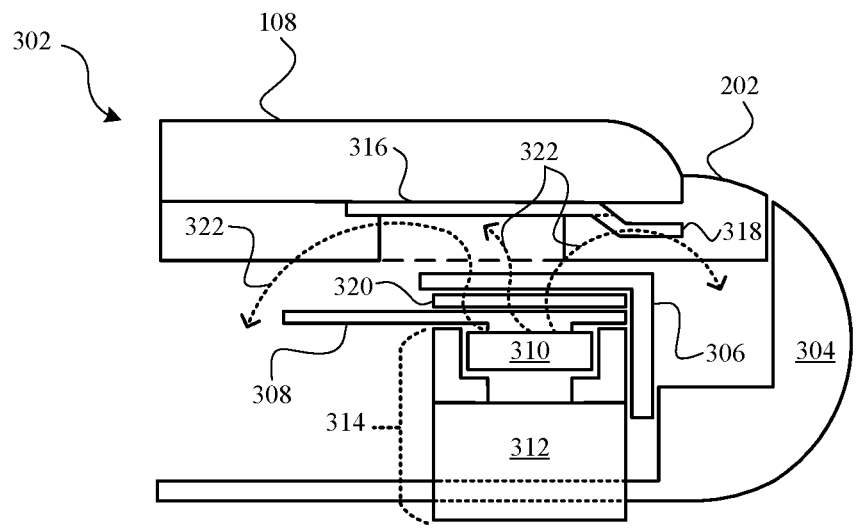

FIGS. 3A and 3B illustrate cross sectional views 300 and 302 of the computing device 102 discussed herein. Specifically, FIG. 3A illustrates how thermal energy 322 generated from a sensor 310 of a camera assembly 314 can traverse the frame region 204 of the frame 202 and be absorbed by the cover glass 108. The camera assembly 314 can include a lens assembly 312 that extends through a housing 304 of the computing device 102. Furthermore, the camera assembly 314 can include a stiffener 306 for ensuring that a flexible connection 308 to the sensor 310 is secure during the lifetime of the computing device 102. The stiffener 306 can also act to absorb and dissipate heat away from the cover glass 108. However, it may be desirable to include one or more additional layers between the cover glass 108 and the camera assembly 314 in order to further help direct the thermal energy 322 away from the cover glass and housing 304 of the computing device 102. For example, FIG. 3B illustrates a cross sectional view 302 of the computing device 102 that incorporates a thermal insert 316 and/or a thermal strip 320 for directing and dissipating the thermal energy 322 from the camera assembly 314. Specifically, FIG. 3B illustrates a thermal insert 316 that can be disposed over a surface of the frame 202, and extend partially into the frame using one or more tabs 318 of the thermal insert 316. The thermal insert 316 can be made from any thermally conductive material that is capable of providing a rigid structure with which to support the cover glass 108 of the computing device 102. For example, in some embodiments the thermal insert 316 can be made from molybdenum or an alloy that includes molybdenum. The thermal insert 316 can traverse a gap in the frame 202 in order to provide additional clearance for the camera assembly 314 and other parts of the computing device 102. The thermal insert 316 can be insert molded into the frame 202 such that the thermal insert 316 appears flush with the frame 202. The tab 318 can be an optional portion of the thermal insert 316, and can be used to anchor the thermal insert 316 into the frame, as well as promote a path for thermal energy 322 to move away from the cover glass 108. The thermal strip 320 can also be provided in the computing device 102 in order to collect and dissipate heat generated by the camera assembly 314. The thermal strip 320 can be made from graphite, a graphite composite material, or any other material suitable for dissipating heat from a source of thermal energy. The thermal strip 320 can be a strip of material that is disposed between the stiffener 306 and the flexible connection 308, between the stiffener 306 and the frame 202, between the thermal insert 316 and the cover glass 108, and/or between the sensor 310 and the lens assembly 312.

Figure 4A:
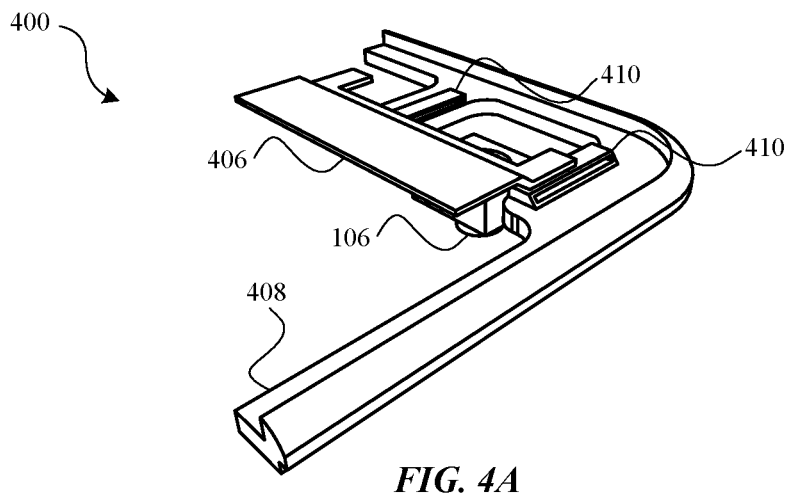
FIGS. 4A-4C illustrate perspective views of steps for attaching a thermal insert to a frame that can be included in the computing device.
Figure 4B:
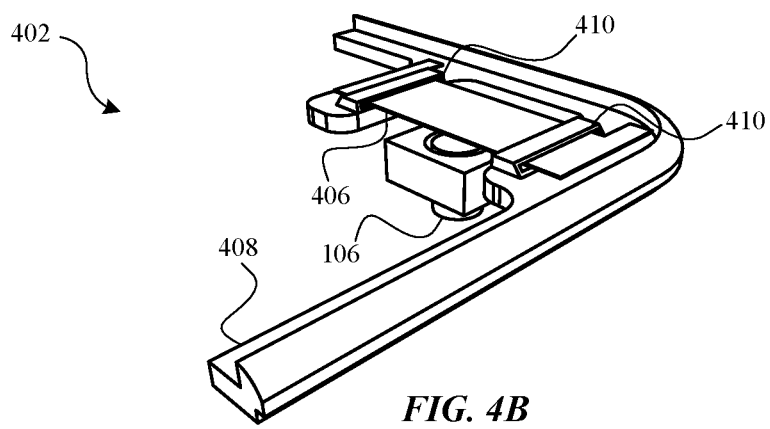
Figure 4C:
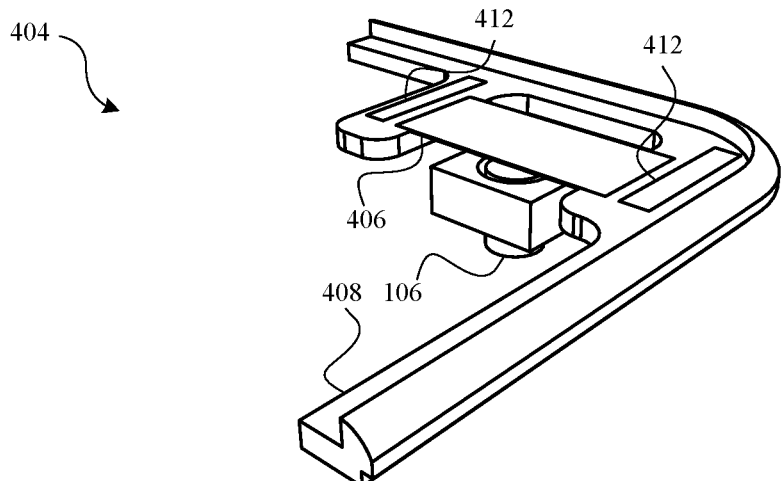

FIGS. 4A-4C illustrate perspective views 400, 402, and 404 of steps for attaching a thermal insert 406 to a frame 408 that can be included in the computing device 102. Specifically, FIG. 4A illustrates a perspective view 400 of the thermal insert 406 before the thermal insert 406 is attached to the frame 408. During assembly of the computing device 102, which can include the thermal insert 406 and the frame 408, the thermal insert 406 can be placed through each slot 410, as illustrated in FIG. 4B. Specifically, FIG. 4B illustrates a perspective view 402 of the thermal insert 406 disposed through the slots 410 before the thermal insert 406 is insert molded to the frame 408. The slots 410 can be formed from the same material as the frame 408 in order that the frame 408 and the slots 410 will form around the thermal insert 406 once the insert molding process of the frame has completed, as illustrated in FIG. 4C. Specifically, FIG. 4C illustrates a perspective view 404 of the thermal insert 406 insert molded into the frame 408. Once the thermal insert 406 is insert molded into the frame 408, insert braces 412 will extend over the thermal insert 406 to secure the thermal insert 406 to the frame 408. The insert braces 412 are portions of the slots 410, which are molded over the thermal insert 406 during the insert molding process. As a result, thermal energy emitted from the camera 106 will be collected at the thermal insert 406 and directed into the frame 408, rather than the thermal energy traveling to the cover glass 108 of the computing device 102.

Figure 5A:
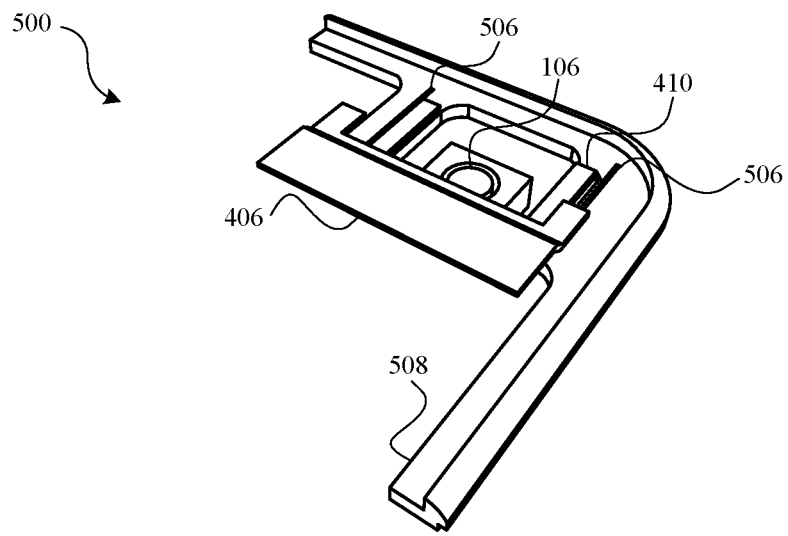
FIGS. 5A-5C illustrate perspective views of steps for attaching a thermal insert to a frame that can be included in the computing device.
Figure 5B:
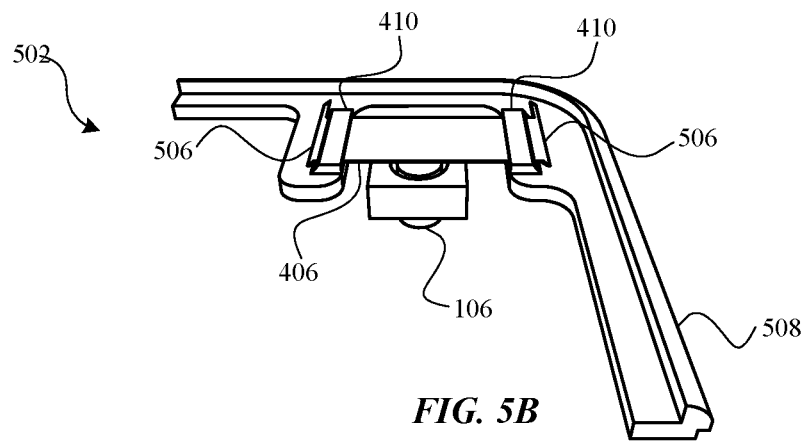
Figure 5C:
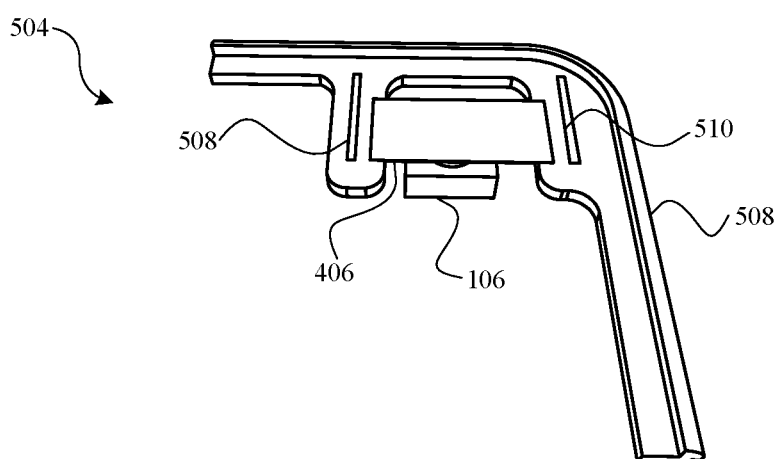

FIGS. 5A-5C illustrate perspective views 500, 502, and 504 of steps for attaching a thermal insert 406 to a frame 508. Specifically, FIG. 5A illustrates a perspective view 500 of the thermal insert 406 before the thermal insert 406 is attached to the frame 508. During assembly of the computing device 102, which can include the thermal insert 406 and the frame 508, the thermal insert 406 can be placed through each slot 410 as well as into each cavity 506, as illustrated in FIG. 5B. Each cavity 506 can extend into a surface of the frame 508 at an angle that is perpendicular to the frame 508 or not perpendicular to the frame 508. Furthermore, a width of each cavity 506 can be at least equal to a thickness of the thermal insert 406. FIG. 5C illustrates a perspective view 504 of the thermal insert 406 molded to the frame 508, such that the thermal insert 406 at least partially extends into the frame 508. Once the thermal insert 406 is inserted into the frame 508, insert braces 510 will extend over the thermal insert 406 to secure the thermal insert 406 to the frame 508. In some embodiments, the slots 410 can be optional features of the frame 508 such that the cavities 506 are only relied upon to attach the frame 508 to the thermal insert 406 during the insert molding process. Furthermore, although only the thermal insert 406 is illustrated in some figures as the mechanism for collecting thermal energy from the camera, other layers and features can be included with the thermal insert 406 to further assist in dissipating thermal energy from the camera 106.

Figure 6A:
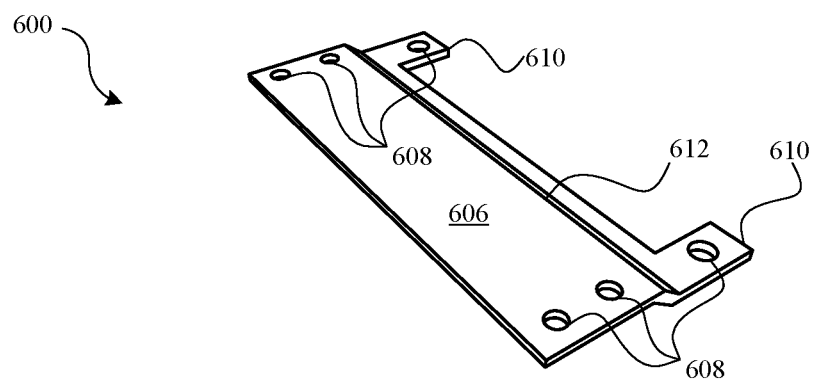
FIGS. 6A-6C illustrate an embodiment of a frame that can interlock with the thermal insert prior to the thermal insert being insert molded to the frame.
Figure 6B:
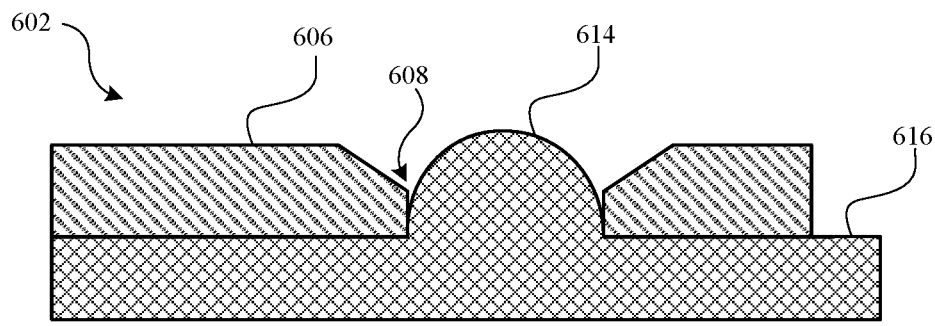
Figure 6C:
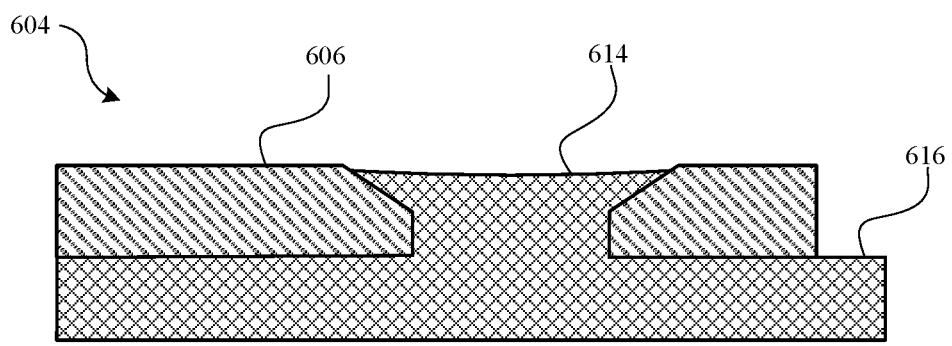

FIGS. 6A-6C illustrate an embodiment of a frame 616 that can interlock with the thermal insert 606 prior to the thermal insert 606 being insert molded to the frame 616. Specifically, FIG. 6A illustrates a perspective view 600 of the thermal insert 606, which can include one or more holes 608 for receiving an interlock 614 of a frame 616. The interlock 614 can be incorporated onto a surface of the frame 616, which can represent any of the frames discussed herein. For example, the interlock 614 can be incorporated onto a surface of the frame 616 where the thermal insert 606 is to be disposed. In some embodiments, the interlock 614 is disposed into a cavity discussed herein with respect to the embodiments of FIGS. 5A-5C. In this way, the thermal insert 606 will extend into the cavity of the frame 616 while an interlock 614 at least partially extends through a hole 608 of the thermal insert 606. In other embodiments, the interlock 614 is disposed on a surface of the frame 616 that is not within the cavity. The thermal insert 606 can include on or more tabs 610, which can also include one or more holes 608. The tabs 610 can extend into a cavity of the frame 616 and a hole 608 on a tab 610 can receive an interlock 614 of the frame 616 in order to keep the thermal insert 606 secured to the frame 616. The thermal insert 606 can further include at least two non-coplanar surfaces separated by an inclined region 612 that can extend away from the frame 616 when the thermal insert 606 is attached to the frame 616. FIG. 6B illustrates a cross sectional view 602 of an interlock 614 of the frame 616 extending through a hole 608 of the thermal insert 606. In some embodiments, one or more holes 608 of the thermal insert 606 can be chamfered. However, in other embodiments, an edge of one or more of the holes 608 can be curved or include a right angle. During assembly of the computing device 102, in which the frame 616 and the thermal insert 606 is to be incorporated, the interlock 614 can be molded to lock onto thermal insert 606, as provided in FIG. 6C. Specifically, FIG. 6C illustrates a cross-sectional view of the interlock 614 molded to form to a portion of the hole 608 provided in FIG. 6B. In this way, the interlock 614 will prevent the thermal insert 606 from disconnecting from the frame 616. Additionally, the interlock 614 can act as a thermal pathway from the thermal insert 606 to the frame 616.

Figure 7A:
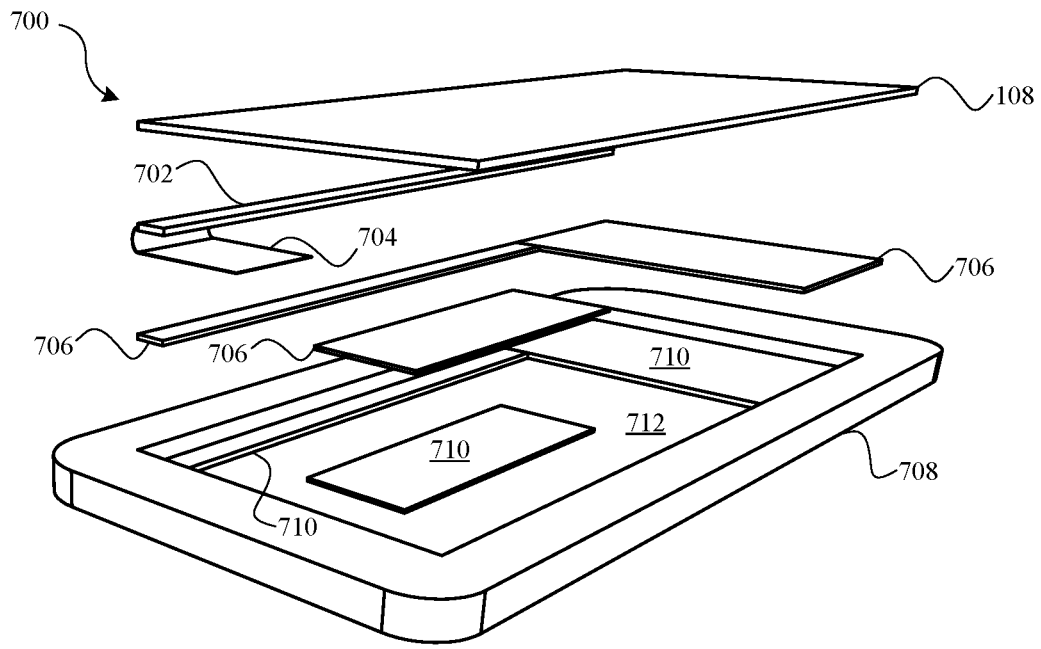
FIGS. 7A and 7B illustrate exploded views of embodiments of thermal spreaders and adhesives that can be used to direct heat away from a cover glass of a computing device.
Figure 7B:
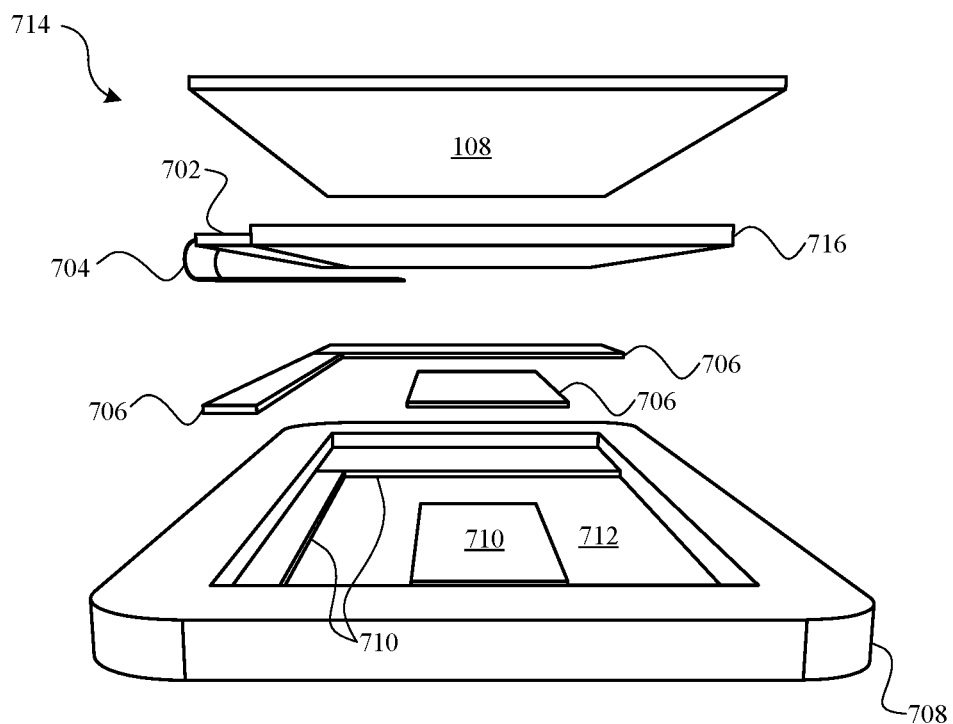

FIGS. 7A and 7B illustrate exploded views 700 and 714 of embodiments of thermal spreaders 706 and adhesives 710 that can be used to direct heat away from a cover glass 108 of a computing device 708. Specifically, FIG. 7A illustrates an embodiment of an LED array 702 that acts as a backlight for a display assembly 716 (shown in FIG. 7B). The LED array 702 can be connected to a flexible connector 704 that is arranged on a side of the LED array 702 opposite the cover glass 108. In this way, less thermal energy emitted by the LED array 702 will be collected between the cover glass 108 and the LED array 702 compared to if the flexible connector 704 was arranged between the LED array 702 and the cover glass 108. As shown in FIG. 7B, the flexible connector 704 can connect to the LED array over surfaces of the LED array 702 and the display assembly 716 that oppose the cover glass 108. FIGS. 7A and 7B also illustrate how thermal spreaders 706 and adhesives 710 can be used to direct thermal energy from the LED array 702 and away from the cover glass 108. For example a thermal spreader 706 can extend over a surface of the LED array 702 that opposes the cover glass 108. The thermal spreaders 706 can be made of any material suitable for collecting and directing thermal energy away from a source of thermal energy. For example, in some embodiments the thermal spreaders 706 can be at least partially composed of graphite. The thermal spreaders 706 can be disposed over an adhesive 710, which can also direct heat away from a source of thermal energy. For example, in some embodiments the adhesive 710 is a graphite infused adhesive. The adhesive 710 can be disposed between various surfaces of the computing device 708 and the thermal spreaders 706. In this way, the adhesive 710 will adhere the thermal spreaders 706 to the computing device 708 while also directing thermal energy away from a source of thermal energy. Some space can be left open on different surfaces of the computing device 708, as illustrated by surface 712, which includes the adhesive 710 and the thermal spreaders 706 on some, but not all, portions of the surface 712. It should be noted that the embodiments described with respect to FIGS. 7A and 7B can be combined with any of the embodiments discussed with respect to FIGS. 1A-6C.

Figure 8:
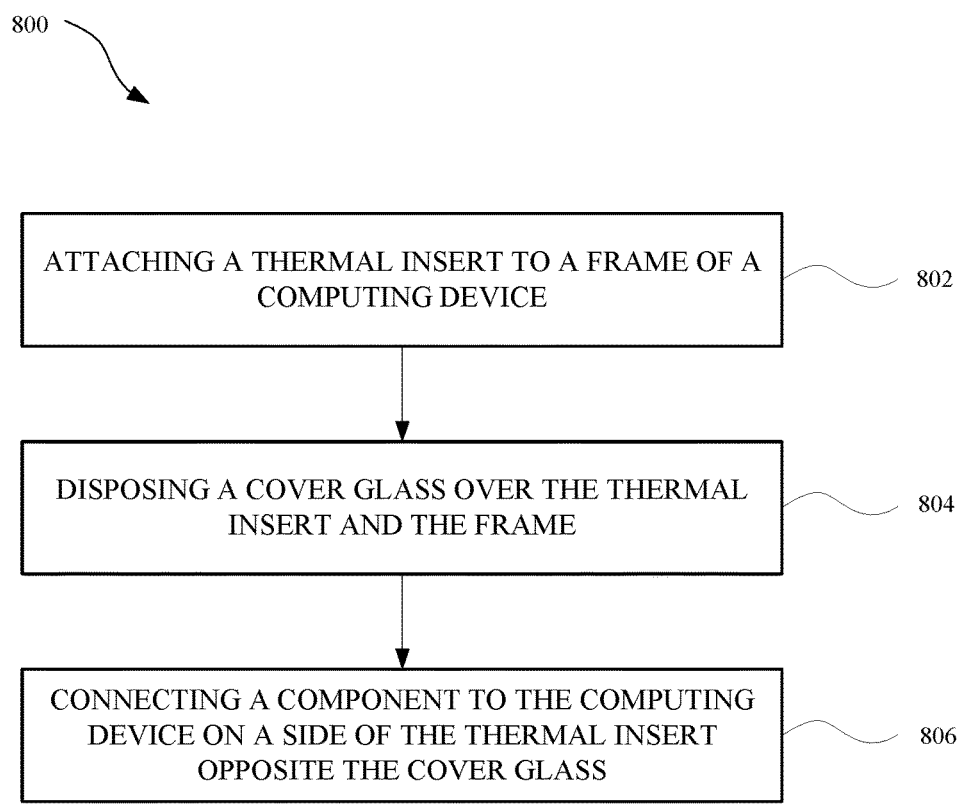
FIG. 8 illustrates a method for assembling a computing device to have a thermal insert between a component and a cover glass of the computing device.

FIG. 8 illustrates a method 800 for assembling a computing device to have a thermal insert between a component and a cover glass of the computing device. The method 800 can be performed by any apparatus or manufacturing device suitable for assembling a computing device. The method 800 can include a step 802 of attaching a thermal insert to a frame of a computing device. The thermal insert can be attached to the frame using insert molding. Additionally, the thermal insert can be any of the thermal inserts discussed herein. For example, the thermal insert can be a molybdenum insert that is disposed within a portion of the frame. The method 800 can further include a step 804 of disposing a cover glass over the thermal insert and the frame. Additionally, the method 800 can include a step 806 of connecting a component to the computing device on a side of the thermal insert opposite the cover glass. The component can be any component capable of generating thermal energy during operation of the computing device. By including the thermal insert between the cover glass and the component, the thermal insert can limit the amount of thermal energy incident upon the cover glass from the component.

Figure 9:
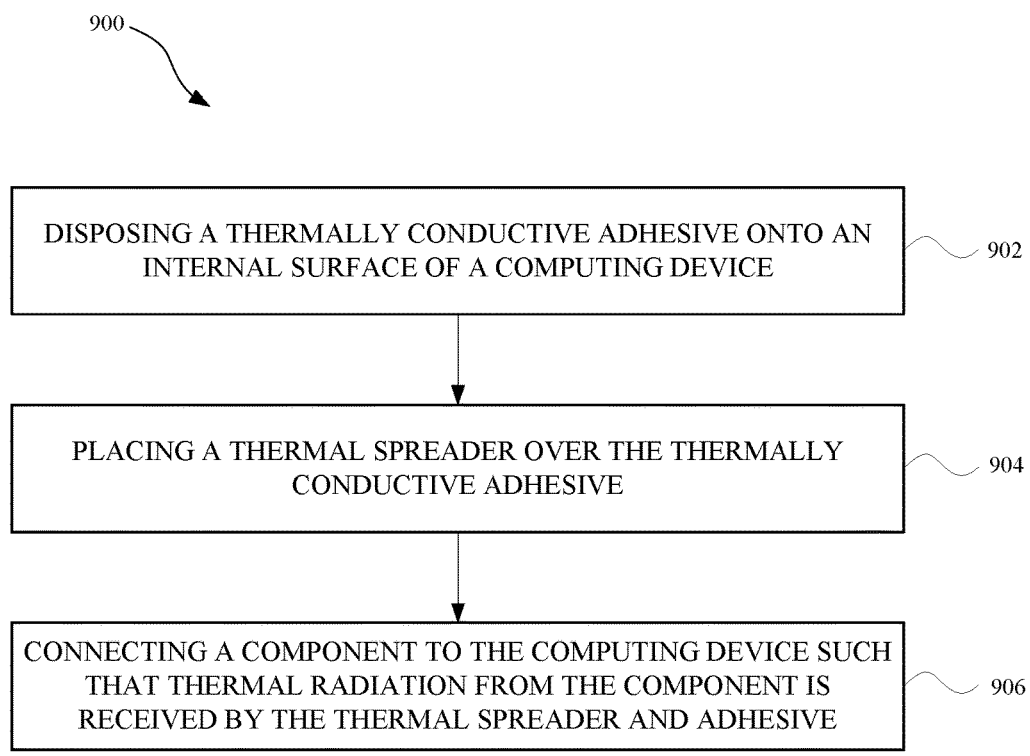
FIG. 9 illustrates a method for incorporating a thermal spreader and thermally conductive adhesive into a computing device.

FIG. 9 illustrates a method 900 for incorporating a thermal spreader and thermally conductive adhesive into a computing device. The method 900 can be performed by any apparatus or manufacturing device suitable for assembling a computing device. The method 900 can include a step 902 of disposing a thermally conductive adhesive onto an internal surface of a computing device. The thermally conductive adhesive can be any adhesive suitable for directing thermal energy away from a source of thermal energy. For example, the thermally conductive adhesive can be a graphite infused adhesive. The method 900 can further include a step 904 of placing a thermal spreader over the thermally conductive adhesive. The thermal spreader can also be made from any material, such as graphite, suitable for directing thermal energy away from a source of thermal energy. Additionally, the method 900 can include a step 906 of connecting a component to the computing device such that thermal energy from the component is received by the thermal spreader and adhesive. By including the thermal spreader and the thermally conductive adhesive, hot spots on external surfaces of the computing device can be avoided by directing thermal energy away from the hot spots.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device having a camera component that outputs thermal energy, the computing device comprising:
a frame comprising an opening;
a thermal insert that at least partially closes the opening and is secured to the frame; and
a cover glass coupled to the frame,
wherein the thermal insert is disposed between the camera component and the cover glass and configured to direct the thermal energy away from the cover glass.

2. The computing device of claim 1, wherein the thermal insert is at least partially composed of molybdenum.

3. The computing device of claim 1, wherein the thermal insert at least partially extends into the frame.

4. The computing device of claim 1, wherein the thermal insert includes at least one hole through which an interlocking portion of the frame extends.

5. The computing device of claim 4, wherein the at least one hole includes a chamfered edge.

6. The computing device of claim 1, wherein the thermal insert includes at least one tab that extends into the frame.

7. The computing device of claim 1, further comprising:
a stiffener layer disposed between the thermal insert and the camera component that is arranged to secure the camera component to a housing of the computing device.

8. The computing device of claim 1, wherein the frame includes a gap over which a portion of the thermal insert extends.

9. A thermal management system for a computing device, the thermal management system comprising:
a thermal spreader configured to absorb thermal energy emitted by a component of the computing device; and
an adhesive disposed between the thermal spreader and an internal surface of the computing device, wherein the thermal spreader and the adhesive are arranged to direct the thermal energy away from the component.

10. The thermal management system of claim 9, wherein the component comprises a backlight component of a display assembly of the computing device, the thermal management system further comprising:
a flexible connector configured to connect to a surface of a light emitting diode (LED) included in the backlight component, wherein the surface of the LED opposes a cover glass of the computing device.

11. The thermal management system of claim 10, wherein the flexible connector extends between the surface of the LED and the thermal spreader.

12. The thermal management system of claim 9, wherein the thermal management system includes at least two thermal spreaders that extend across different non-coplanar surfaces of the computing device.

13. The thermal management system of claim 9, wherein the adhesive is a graphite infused adhesive.

14. A method for assembling a computing device, the method comprising:
attaching a thermal insert to a frame of the computing device; and
attaching a cover glass to the frame such that a component of the computing device is at least partially separated from the cover glass by the thermal insert.

15. The method of claim 14, wherein attaching the thermal insert includes inserting the thermal insert into a cavity of the frame.

16. The method of claim 15, wherein the thermal insert is insert molded into the frame after the thermal insert is inserted into the cavity of the frame.

17. The method of claim 14, wherein the thermal insert is at least partially composed of molybdenum, and attaching the thermal insert to the frame includes laying the thermal insert at least partially over a gap of the frame.

18. The method of claim 14, further comprising:
applying a graphite infused adhesive to a surface of the computing device.

19. The method of claim 18, further comprising:
disposing a thermal spreader over the graphite infused adhesive to bond the thermal spreader to the surface of the computing device.

20. The method of claim 19, further comprising:
connecting a flexible connector to a light emitting diode (LED) array of the computing device such that the flexible connector at least partially extends between the thermal spreader and the LED array.

* * * * *